US009228492B2

(12) United States Patent
Nobelen

(10) Patent No.: US 9,228,492 B2
(45) Date of Patent: Jan. 5, 2016

(54) SAFETY DEVICE FOR CONTROLLING AN ENGINE COMPRISING ACQUISITION REDUNDANCY OF A SENSOR MEASUREMENT

(71) Applicant: Florent Nobelen, Moissy-Cramayel (FR)

(72) Inventor: Florent Nobelen, Moissy-Cramayel (FR)

(73) Assignee: SNECMA, Paris (FR)

( * ) Notice: Subject to any disclaimer, the term of this patent is extended or adjusted under 35 U.S.C. 154(b) by 342 days.

(21) Appl. No.: 13/752,773

(22) Filed: Jan. 29, 2013

(65) Prior Publication Data

US 2013/0192560 A1 Aug. 1, 2013

(30) Foreign Application Priority Data

Jan. 30, 2012 (FR) ...................................... 12 50848

(51) Int. Cl.
*G06F 19/00* (2011.01)
*F02C 9/00* (2006.01)
*F02B 77/08* (2006.01)
*G05B 9/03* (2006.01)

(52) U.S. Cl.
CPC . *F02B 77/08* (2013.01); *G05B 9/03* (2013.01); *G05B 2219/24182* (2013.01)

(58) Field of Classification Search
USPC ....................................... 701/100; 60/39.281
See application file for complete search history.

(56) References Cited

U.S. PATENT DOCUMENTS

| 4,718,229 | A  | * | 1/1988 | Riley ......................... 60/39.281 |
| 5,008,561 | A  |   | 4/1991 | Madeley et al. |
| 5,206,810 | A  |   | 4/1993 | Bools et al. |
| 2003/0056491 | A1 | * | 3/2003 | Coleman et al. ........... 60/39.281 |
| 2005/0109038 | A1 | * | 5/2005 | Matthews ....................... 60/779 |
| 2007/0085429 | A1 | * | 4/2007 | van der Woude ............... 310/64 |
| 2012/0025032 | A1 | * | 2/2012 | Hopdjanian et al. ........ 244/53 R |

OTHER PUBLICATIONS

French Office Action dated Dec. 13, 2012 for Appln. No. 1250848.

* cited by examiner

*Primary Examiner* — Thomas G Black
*Assistant Examiner* — Tyler Paige
(74) *Attorney, Agent, or Firm* — Pillsbury Winthrop Shaw Pittman LLP

(57) ABSTRACT

A safety device for controlling an engine includes a first and a second sensor of an environmental parameter, two channels for processing data measured by the sensors, each of the channels each including a command module and a power supply. The device includes at least two relays. The first relay is capable of receiving a first command coming from a supply and delivering, in the absence of the first command, data from the first sensor to the second command module. The second relay is capable of receiving a second command coming from the supply and delivering, in the absence of the second command, data from the second sensor to the first command module. The supply of the active channel sends a command to the relay associated with it, the relay sending data from the sensor to the active channel.

10 Claims, 3 Drawing Sheets

SAFETY DEVICE FOR CONTROLLING AN ENGINE COMPRISING ACQUISITION REDUNDANCY OF A SENSOR MEASUREMENT

CROSS REFERENCE TO RELATED APPLICATIONS

This application claims priority to French Patent Application No. 1250848, filed Jan. 30, 2012, the content of which is incorporated herein by reference in its entirety.

FIELD

The field of the invention relates to devices for controlling the environmental conditions of systems for regulating turbojet type aircraft engines. Lastly, the invention relates to devices using redundancy computations from value measurements from sensors situated near the engine, particularly resistance variation sensors. In a particular application, the invention refers to the field of protection systems, particularly with regard to fires and engine overspeeds.

BACKGROUND

Current engines of the turbojet type are often associated with regulating computers that are generally installed near and sometimes even in an area, called the "fire area" of the engine. In the "fire area," continuously monitoring the temperature is essential to prevent a potential fire.

One of the main dangers in the case of fire is the loss of control of the engine that may introduce an engine overspeed.

A second computer may be provided so as to prevent an engine overspeed. This may be the case when it is possible to separate the control of the engine regulation functions and the overspeed control and detection functions. Typically, in this case a breakdown of one computer does not automatically lead to the breakdown of the second.

Depending on the architectures, the overspeed regulation and protection functions may be carried out by the same computer or by independent computers.

In architectures where the computer ensures the two functions, some precautions must be taken so as to minimize cases of possible equipment breakdowns and ensure a sufficient level of operational safety. The operational safety level may be ensured by a redundant architecture of values from the measurement sensors so as to enable exhaustive detection of cases of breakdowns while minimizing the rates of false detection regardless of the configuration of the controlled equipment.

In one fire area near a turbojet, a fire may:
introduce an overspeed, since the computer regulation part may for example:
  generate an erroneous fuel regulation command or;
  engage an erroneous valve closure due to an error in the control operating conditions or;
  acquire erroneous data from the sensors,
Lose overspeed protection due to loss of the computer overspeed function.

In case of fire, a risk of generating erroneous engine regulation behavior possibly triggering a malfunction leading to loss of overspeed protection may occur. The engine protection and regulation control functions are therefore sensitive to the same malfunctions. The cause of the overspeed protection system malfunction is then the same as that of the engine regulation.

The event called "uncontrolled overspeed" is classified as a so-called "Hazardous" event by the certification authorities. Preventing the scenario mentioned previously is therefore essential. In particular, the common mode produced by the computer hosting the engine regulation and overspeed protection functions must be supported and/or made redundant so as to enable rapid detection of the measurements with a minimized false detection rate. The performance level must be identical in the nominal case and in the case of an accident for example, i.e., in which the environmental conditions are extraordinary.

The previous reasoning also applies to the overthrust protection and overthrust regulation system.

Some current solutions enable this problem to be resolved. One solution consists of putting a fire protection system in place that cuts the engine to prevent uncontrolled overspeeds during a detection.

One possible architecture for the regulating computer fire protection system uses two internal temperature sensors and two thermistor type external fire detectors.

In one implementation, each of these external detectors may be regarded as variable resistance. In technical literature, this variable resistance is also known as "VRT," standing for "Variable Resistance Transducer."

The thermistor may be configured such that detection of global overheating or a localized flame may occur due to the variation in its resistance. The regulating computer regularly acquires a resistance value from a thermistor and performs calculations enabling the change in temperature to be controlled.

In particular, the regulating computer converts the value of the measured resistance to temperature from a table, for example. Lastly, a comparison may be made from a predefined threshold. When the value exceeds a threshold, overheating or a flame may be declared by the detection system.

Other conditions may be tested by calculations of environmental parameters, particularly by comparing the values with predefined thresholds. The regulating computer may be programmed so as to cut the engine to prevent an overspeed in case of the detection of an environmental parameter, such as temperature, going beyond a defined threshold.

Nevertheless, existing solutions present disadvantages regarding operational safety.

So as to enable, on the one hand, optimal detection of values from the environmental condition measurement sensors and, on the other hand, effective discrimination between the case of a sensor malfunction and the case of detection of a real fire for example, control devices often comprise two identical chains functionally enabling data collection to be replicated before an action is undertaken. These chains are also called channels. Each channel comprises a measurement acquisition module, a control module and a power supply. The channels should ideally be independent from each other, nevertheless they may exchange information so as to perform correlation operations of data measured on both sides.

A first channel A and a second channel B perform similar calculations so as to correlate their results and ensure that detection of a value from a sensor indicating a danger is really such a detection and not a detection error.

One of the major problems is that when a channel fails, then data replication must always be ensured, all the more so as a channel failure has just occurred.

For example, it is understood that an aircraft in flight and undergoing degradation of one of its engine control channels must be able to finish its flight and return while ensuring maximum safety.

In certain cases, the aircraft must go on a certain number of missions before any maintenance operation.

In the present case, if a channel fails, only one sensor and one fire detector remains to ensure detection of a fire or overheating.

In case of loss of a channel, malfunction of the remaining fire detector is not an operational constraint to the extent that this malfunction detection is combined with detection of a fire, for example from an internal temperature sensor. The fire is also considered to be a malfunction, therefore to not detect a fire breaking out with a single channel, a double malfunction must be produced. In the latter case, the false malfunction rate is acceptable.

However, an inadvertent detection may occur on a simple malfunction of the remaining fire detector, and the inadvertent detection rate of a detector not being low enough, one risk is to detect a fire when no fire exists and to therefore cut the engine.

This latter solution does not constitute an acceptable operation for an aircraft.

Some solutions consist of multiplying the number of sensors and increasing architecture density by making them all the more complex and costly. For example, it is possible to use up to four temperature sensors, or two per channel.

With this solution, each channel acquires two thermistor measurements. Therefore, when one channel malfunctions and only one functional channel remains, two thermistors remain that issue their measurements.

An inadvertent fire or overheating detection may therefore only be because of a double malfunction, which is acceptable.

However, by doubling the number of thermistors, the mass of the device is doubled. In addition, the cost is increased all the more as it is necessary to add a second sensor onto each of the channels. Lastly, the available volume around the computer does not guarantee installation of these four detectors.

Another solution consists of using non-electrically powered sensors, as a consequence they may be independent from the power supply of the channel to which they are associated. For example, "pneumatic" type fire detectors may be used.

Pneumatic detector technology enables discrete entities to be acquired by the computer. When a device acquires a discrete entity, it acquires a current but the fact that it is divided by two due to redundancy and the fact that the redundancy degrades accuracy does not cause interference, since only "powered"/"unpowered" states are necessary. Obtaining the exact value of the current is not necessary. In addition, as mentioned previously, the computer should not power the detectors with this pneumatic technology.

However, a pneumatic detector is approximately twice as expensive as a thermistor, and approximately twice as heavy, and as this would involve modifying the electrical interface on each channel, this solution presents a disadvantage in solutions in which it is necessary to reduce costs.

SUMMARY

An aspect of the invention enables the aforementioned disadvantages to be resolved.

An aspect of the invention is directed to a safety device for controlling an engine comprising at least one first and one second environmental parameter sensor, at least one first and one second channel for processing data measured by the sensors, each of the channels comprising an active or passive state defining an active channel and a passive channel, the active channel driving at least one actuator of the engine, each of the channels respectively comprising a first and a second control module and a first and a second power supply.

In an embodiment, the device comprises at least one first and one second relay.

The first relay being capable of receiving a first command coming from the first supply and issuing, in the absence of the first command, data from the first sensor to the command module of the second channel.

The second relay being capable of receiving a second command coming from the supply of the second channel and issuing, in the absence of the second command, data from the second sensor to the command module of the first channel.

In an embodiment, the supply of the first channel sends a command to the relay associated with it, the relay thus commanded sending data from the sensor associated with it to the command module of the active channel.

An aspect of the present invention therefore aims to propose a solution enabling the signal from temperature sensors such as thermistors to be redundant, such that each command module of each channel acquires data from the different sensors. Therefore in case of malfunction of one of the channels, the device of the invention ensures the transport of values measured by at least two sensors to the command module of the active channel, i.e., the channel driving the engine actuators. The redundancy of signals delivered to the command module of the active channel reduces the rate of false malfunction detections.

According to these embodiments, command modules K1 and K2 enable different actuators $Q_i, i\in[1\ N]$ that control the engine to be driven. In addition, the command module comprises a computer enabling operations on instructions or values received from the signal processing devices or signal processors to be carried out. Lastly, the command module is capable of generating the transmission of data, for example a health word, to another command module.

Therefore, an inadvertent detection can only be produced on a double malfunction, i.e., a double inadvertent detection, instead of being produced on a single malfunction.

One of the difficulties solved by an embodiment of the invention is that the redundancy of measurements of signals from sensors never takes place.

In particular, a first reason is that a sensor such as a thermistor should be powered by the channel to which it is connected. Therefore redundancy poses a constraint regarding supplying the sensor when the channel malfunctions. Supplying it by only one of the two arbitrarily chosen channels poses a problem in case this channel malfunctions. In addition, variable resistance sensors cannot be powered by several power supplies at the same time without having to modify the electrical signal acquisition circuits.

A second reason is that to obtain a signal from a variable resistance type temperature sensor, a current and a voltage are acquired, the resistance then is obtained by Ohm's law. To make the electrical circuit between the two channels redundant would therefore reduce the intensity substantially by two, to the components utilized. Consequently, a multiplication by two internally is not possible, as the accuracy would be too degraded.

An embodiment of the invention ensures redundancy of sensor measurements in each command module such that this redundancy is possible and made possible. The command modules each beneficially comprise a computer carrying out measurements on the measurements acquired by the sensors and processed by the processing devices.

In an embodiment, each channel comprises a signal processing device.

In an embodiment, the relay power supply is performed by an electrical command.

In an embodiment, the sensors are powered by the power supplies of each channel.

In an embodiment, the sensors are variable resistance sensors.

In an embodiment, the sensors are temperature sensors.

In an embodiment, the sensors are capacitive sensors.

In an embodiment, the command module of the active channel drives the suspension of the engine or its speed reduction.

In an embodiment, each relay comprises a double switch.

In an embodiment, each channel comprises an internal temperature sensor.

BRIEF DESCRIPTION OF THE FIGURES

Other characteristics and benefits of the invention will emerge upon reading the following detailed description, with reference to the attached figures, that illustrate.

DETAILED DESCRIPTION

In the rest of the description:

a relay and a channel are said to be associated to the extent that an electrical power command of the channel is physically connected to the relay;

A relay and a sensor are said to be associated to the extent that a relay transports the measurements from the sensor to a given component.

Figure 1:
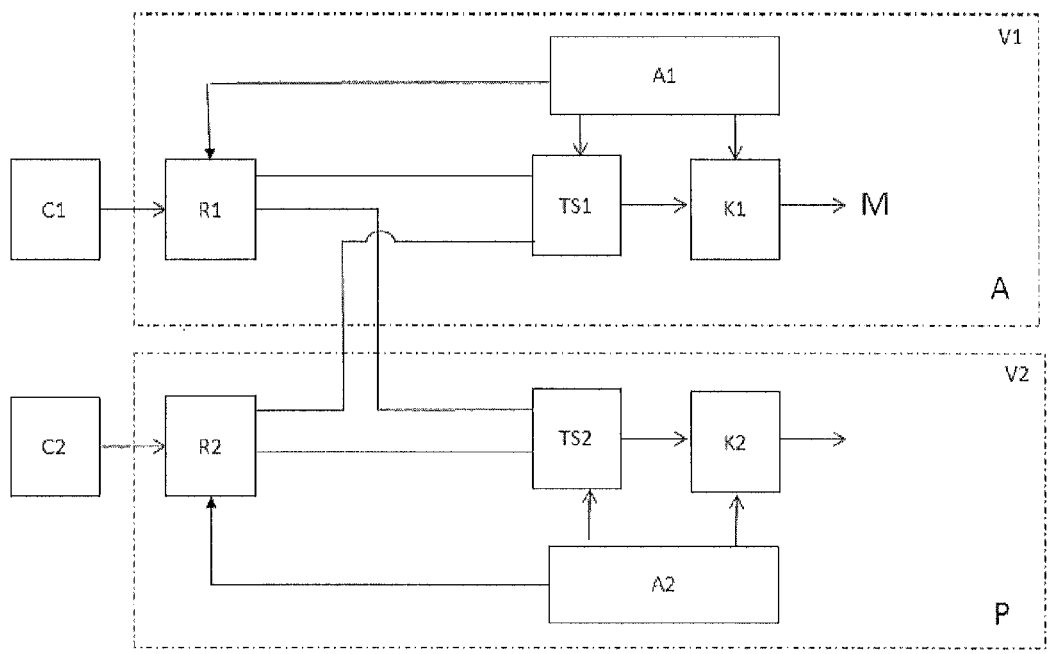
FIG. 1 is a simplified diagram comprising the temperature control on a double channel in accordance with an embodiment of the invention.

FIG. 1 represents a device according to an embodiment of the invention comprising two channels enabling measurements from sensors of data relative to environmental conditions to be made redundant. Among the environmental conditions monitored near the engine, the ambient temperature is measured at regular times so as to prevent the occurrence of a fire.

The analysis of measurements by one or more of the computers enables action, particularly by the generation of commands on the actuators controlling the engine. It is then possible to prevent, for example, an engine overspeed.

When "a computer" is mentioned in the present application, this refers to the computer present in a K1 or K2 command module.

Each channel V1, respectively V2, comprises a signal acquisition device, said signals coming from the sensors. In FIG. 1, the signal acquisition devices are noted TS1 or TS2.

In addition, each channel comprises at least one command module K1, respectively K2, enabling regulation commands to be generated to the actuators acting on the engine M. The commands are adapted and generated according to the values of measurements from sensors C1 and/or C2.

In addition, each channel V1 or V2 comprises a power supply A1, respectively A2, supplying the components of each of the channels.

The device of an embodiment of the invention comprises at least two relays R1 and R2 that are capable of switching:

on the one hand the acquisition of measurements made by the sensors C1, C2 to the channels V1, V2 and;

On the other hand a supply current delivered by the power supplies A1, A2 of each channel to the sensors C1 and C2.

Each channel comprises a state defined by the following states: Active or passive. The active channel delivers regulation commands to actuators acting on an engine M while the passive channel is silent with regard to these same actuators. In FIG. 1, the active channel is channel V1.

In an embodiment, each status of a channel is allocated by internal command modules K1, K2 to each of the channels V1, V2. One connection may be provided between the two command modules K1, K2 to exchange data, particularly data defining the status of each channel.

According to embodiments, the allocation logic of the active/passive status of a channel may be defined by malfunction or operational cycle histories or else by any other parameter that may also be combined with other parameters defining that a channel is active or passive. The two channels may exchange a health word, the "healthiest" channel, i.e., the channel having had the least malfunctions, becomes active, the other then becoming passive.

When a malfunction is detected on one of the active channel components, the channel may automatically become passive and may give to the other channel a datum defining the new active status of the channel not having undergone the malfunction.

The device comprises, in an initial configuration, relays and an operating mode of the relays defining a predefined switching logic.

One aspect of the invention is to enable the command module driving the actuators controlling the aircraft engine to have measurements from at least two sensors so as to limit the rate of false detections.

The device according to an embodiment of the invention also comprises at least two sensors and also comprises two relays. FIG. 1 represents a configuration of two relays enabling the acquisition of sensor measurements delivered in each of the channels to be made redundant.

Therefore active channel V1 in this configuration acquires measurements from sensors C1 and C2.

Figure 2:
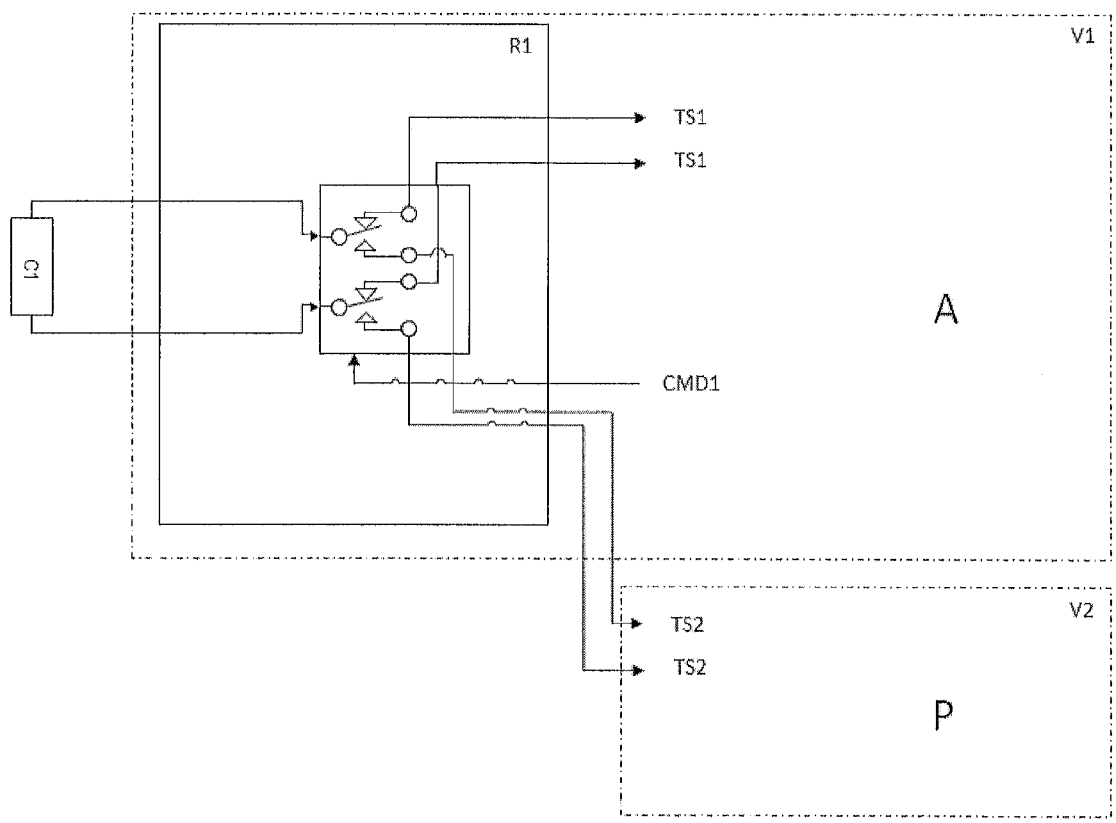
FIG. 2 is a detailed diagram of a first relay of the device and its interfaces according to an embodiment of the invention.
Figure 3:
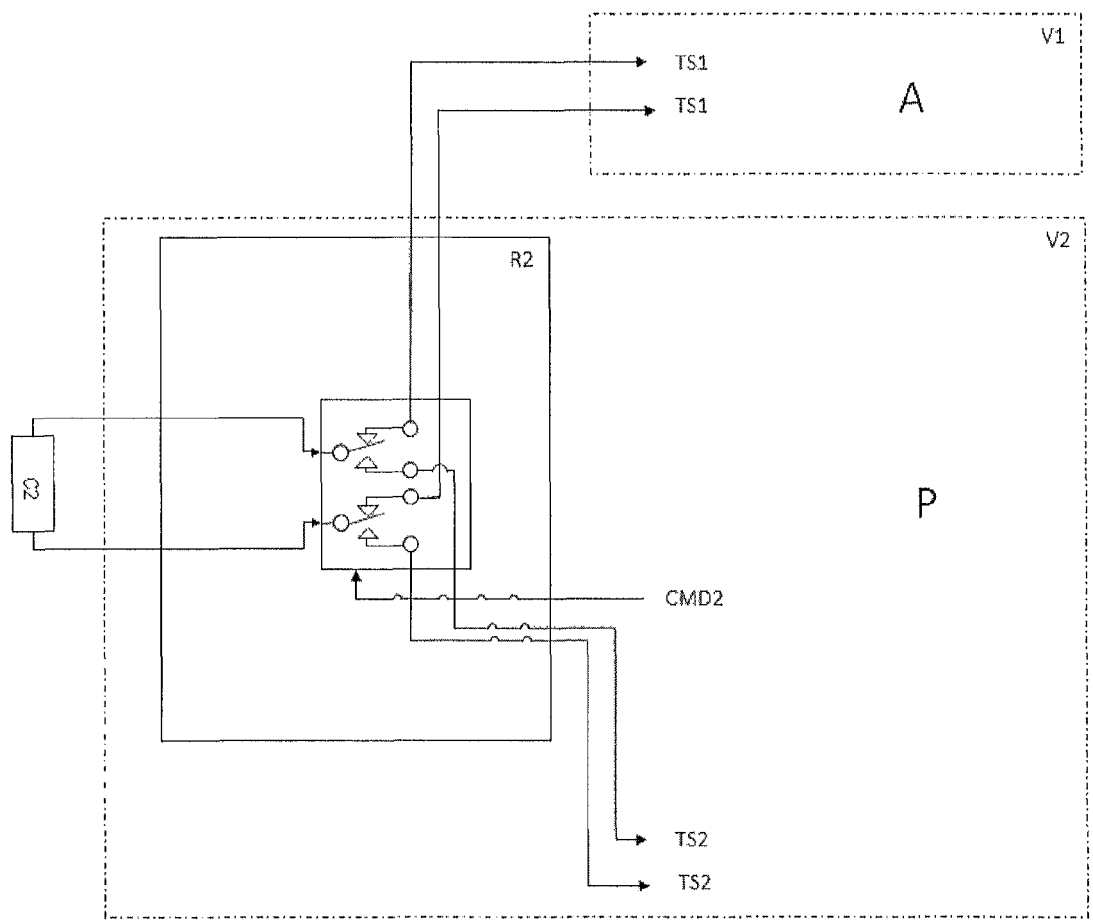
FIG. 3 is a detailed diagram of a second relay of the device and its interfaces according to an embodiment of the invention.

FIGS. 2 and 3 illustrate relays in an embodiment of the invention as well as an architecture enabling a switching logic to be defined.

FIG. 2 represents in detail an example of relays R1 and R2 for variable resistance thermistor type sensors.

Relay R1 is associated with the first sensor C1 and comprises a double switch. FIG. 3 represents a relay R2 associated with a second sensor C2 and itself also comprising a double switch.

Each relay comprises physical outputs capable of either transporting sensor measurements in the first channel or transporting sensor measurements in the second channel.

When the switches of a relay are in a high position, as represented in FIG. 2 or FIG. 3, power supply A1 of the first channel V1 powers the sensor or sensors associated with the relay. The active channel acquires sensor measurements for each relay.

When the switches from a relay are in a low position, this configuration not represented, power supply A2 of the second channel V2 powers the sensor or sensors associated with the relay.

Devices of embodiments of the invention enable a configuration in which the commands noted CMD1 and CMD2 coming from each of the channels V1, respectively V2, enable the position of the switches of each of the relays to be electrically controlled.

The device of an embodiment of the invention enables configuration of relays such that a first relay transports measurements from a first sensor C1 to which it is associated to the channel that comprises a controlled return to another relay, in the example the second relay from FIGS. 2 and 3.

A second relay is configured symmetrically to the extent that the latter transports measurements from a second sensor C2 to which it is associated to the channel that comprises a controlled return to the first relay.

In the default configuration, the relays and channels are "crossed" to the extent that a relay transports the measurements from sensors associated with it to the channel to which the relay is not associated.

Relay R1 is associated with channel V1 through a physical connection possibly enabling the generation of a CMD1 command.

Relay R2 is associated with channel V2 through a physical connection possibly enabling the generation of a CMD2 command.

Relay R1 is associated with sensor C1, C1 sending its measurements to the relay R1.

Relay R2 is associated with sensor C2, C2 sending its measurements to the relay R2.

In an embodiment, the passive channel does not transmit commands to the relay associated with it. In the example of FIG. 3, no CMD2 command is transmitted to the relay. Therefore relay R2 is in its default configuration and transports the measurements from sensor C2 to channel V1.

On the other hand, the active channel, V1 in FIG. 2, transmits an electrical command CMD1 to relay R1 that is associated with it.

When an electrical command, for example CMD1, as represented in FIG. 2, is sent to the associated relay R1, the relay changes the switch and directs the measurements from the sensor associated with it, i.e., C1 in FIG. 2, to the channel V1 to which it is associated.

Therefore the electrical command CMD1 coming from the active channel modifies the position of the default switches. The latter are positioned upward as represented in FIG. 2.

Therefore the first channel V1, that is the active channel in this example, and in particular the signal processing device or signal processor TS1 receive the signals directed by relays R1 and R2 from the sensors. The signal processing device may possibly comprise functions including threshold detection, reshaping of the signals received and generating instructions for the command module.

In a variation, a single component carries out the functions of acquiring and processing values measured by the sensors and command functions from the command module.

The switching architecture of the device of the invention is designed such that at least one channel receives signals from two sensors. This architecture ensures a reduced and acceptable rate of false detections.

When a relay is not controlled, it is mechanically positioned in its default position. The default position is defined as being that which enables it to deliver measurements from a sensor associated with it to the channel that is not associated with it.

For example, when relay R1 is not controlled, i.e., when channel V1 is not active, the relay R1 positions its switches downwards such that the measurements taken from sensor C1 are sent to the second channel V2, notably to the signal acquisition device of the second channel V2.

When the first relay R1 is controlled, it changes the position of its switches, then positioned upwards. Relay R1 then transports the measurements from sensor C1 to the first channel V1 that has become active.

When it is the second relay R2 that is controlled by the second channel V2 that is then active, the switches of the second relay are then downwards, orientating the signals from sensor C2 to the second channel V2.

The device according to an embodiment of the invention therefore takes into consideration the status of the channel so as to switch the relay switches such that the command module of the active channel receives measurements from two sensors.

From the point of view of a channel, if it is active, it sends a command to the relay associated with it. The latter positions its switches such that the command module of the active channel receives signals from the sensor associated with it.

When a channel is passive, no command is sent to the relay associated with the channel. This latter relay sends by default measurements from the sensor associated with it to the channel that is not associated with it.

In an improved mode, a connection is established between the two channels. This connection enables signals to be exchanged between the two channels. In an embodiment of the invention, a correlation of data may be carried out so that the data collected by one channel may be compared with that received by the other channel independently of the active/passive status of each of the channels.

This solution also provides that the two channels may ensure detection.

A benefit of the invention is that when the two channels are operational, the active channel acquires data transported by the two relays. The active channel transmits this data to the passive channel by a connection between the two command modules of each of the channels. The two channels thus each have redundant data coming from measuring sensors C1, C2.

According to the embodiments, it is possible that upstream from a relay, several sensors send their measurement to the relay associated with them. In one configuration of the device of the invention, the relays comprise several inputs enabling multiplication of a same sensor or the connection of different sensors. Each type of sensor may be made redundant by the device of the invention.

The simplest mode of an embodiment of the invention relates to a single sensor connected to a relay. But a simple adaptation would provide several sensors upstream from each relay.

When a channel malfunctions, a benefit of the device enables the command modules to be configured so that the channel that is not malfunctioning becomes the active channel. This latter channel, applying the switching logic defined previously, sends a command to the relay associated with it. The latter relay then transports, by switching switches, the measurements from the sensor to which it is associated to the newly active channel.

The relay of the malfunctioning channel is then in a default configuration. The relay associated with the malfunctioning channel no longer receives the electrical command coming from the channel that has become malfunctioning. Consequently, this relay transports measurements from the sensor associated with it to the channel that is not associated with it.

In this configuration in which one channel malfunctions, the other channel receives redundant data corresponding to the measurements from the two sensors, each sensor being associated with one relay.

When a relay malfunctions and this relay is associated with the active channel, the active channel may no longer control its relay. Consequently, the relay associated with the active channel is repositioned in its default configuration and sends its data to the passive channel.

The relay associated with the passive channel is not controlled by its relay. Consequently, each of the channels acquires data from the relay that is not associated with it.

Subsequently, the data respectively received by the two channels K1 and K2 are exchanged between each other by the inter-channel connection so as to allow each channel to have measurements from each sensor.

When a relay malfunctions and this relay is associated with the passive channel, the passive channel no longer controls its relay. Consequently, the relay associated with the passive channel is positioned by default and sends data to the channel that is not associated with it, i.e., the active channel.

The relay associated with the active channel sends data to the active channel.

Consequently, in this configuration, the active channel receives data from the two relays and transmits it to the command module of the passive channel by the connection between the two command modules.

When a first sensor malfunctions, the malfunction is seen by the channel that acquires the data coming from the relay that is associated with it, for example the active channel. Consequently, a false detection generated by the second sensor and transmitted to the active channel is considered to be a double malfunction. The active channel observing an absence of signals and receiving an erroneous signal establishes two independent errors.

In fact, a first sensor malfunctions and the second acquires a false measurement, which may be understood to be a double malfunction. Consequently, this double malfunction case will not be more unfavorable than another double malfunction of the system. The rate of false detections will therefore be equivalent to any other double malfunction that may be produced in the device.

The device of an embodiment of the invention enables redundant signals or data to be delivered to the command module of the active channel thanks to the placement of relays and a physical and logical architecture of switching said relays.

The device of an embodiment of the invention enables:

The obtaining of a mechanism of making the sensors redundant so as to always enable a redundancy of acquisition of their signals;

A relay switch logic to be implemented for each of the two sensors used.

The device of an embodiment of the invention may comprise variable resistance type sensors, such as temperature sensors.

In other embodiments, other sensors may be compatible with the device of an embodiment of the invention, particularly all the sensors that need to be powered.

More specifically, variable resistance measurement sensors (VRT) are found. These are "fire" detectors of the "thermistor" type, for example, some of which form temperature sensors.

It is also possible to equip the device of an embodiment of the invention with pressure sensors. In this case, they generally operate with a strain gauge that needs to be powered.

Lastly, it is possible to equip the device of an embodiment of the invention with capacitive sensors that enable, for example:

an oil or fuel density to be measured;
permittivity to be measured, to estimate fuel flow;
An oil level to be measured.

Lastly the device of an embodiment of the invention may also apply to certain switches that use a voltage divider bridge, for example: Those for thrust reversers or oil levels.

The invention claimed is:

1. A safety device for controlling an engine comprising:
   a first and a second sensor for an environmental parameter;
   a first and a second channel configured to process data measured by the first and second sensors, each of the channels comprising an active state or a passive state defining an active channel and a passive channel, the active channel to drive an actuator of the engine, each of the channels respectively comprising a first and a second command module and a first and a second power supply;
   a first and a second relay,
      the first relay being configured to receive a first command coming from the first power supply and to issue, in the absence of the first command, data from the first sensor to the command module of the second channel,
      the second relay being configured to receive a second command coming from the second power supply of the second channel and to issue, in the absence of the second command, data from the second sensor to the command module of the first channel,
      the supply of the active channel to send a command to the relay associated with it, the relay thus commanded to send data from the sensor associated with it to the command module of the active channel.

2. The safety device according to claim 1, wherein each channel comprises a signal processor.

3. The safety device according to claim 1, wherein the supply of the relay is carried out by an electrical command.

4. The safety device according to claim 1, wherein the sensors are powered by power supplies of each channel.

5. The safety device according to claim 1, wherein the sensors are variable resistance sensors.

6. The safety device according to claim 5, wherein the sensors are temperature sensors.

7. The safety device according to claim 1, wherein the sensors are capacitive sensors.

8. The safety device according to claim 1, wherein the command nodule of the active channel is configured to enable suspension of the engine or a reduction in the engine speed to be controlled.

9. The safety device according to claim 1, wherein each relay comprises a double switch.

10. The safety device according to claim 1, wherein each channel comprises an internal temperature sensor.

* * * * *